United States Patent

Steinhardt et al.

[15] 3,687,518

[45] Aug. 29, 1972

[54] SELF-SLITTING SPECTROSCOPE

[72] Inventors: Ralph G. Steinhardt, Box 9716, Hollins College, Va. 24020; Julia W. Calhoun, 326 Melrose Lane, Tryon, N.C. 28782

[22] Filed: March 23, 1971

[21] Appl. No.: 127,251

[52] U.S. Cl. ................................. 356/74, 35/19 B
[51] Int. Cl. ........................... G01j 3/00, G09b 23/06
[58] Field of Search .................. 356/74, 79; 35/19 B

[56] References Cited

UNITED STATES PATENTS 2,431,734   12/1947   Cutting ..................... 35/19 B

*Primary Examiner*—Ronald L. Wibert
*Assistant Examiner*—V. P. McGraw
*Attorney*—Burns, Doane, Swecker & Mathis

[57] ABSTRACT

A self-slitting spectroscope comprising a narrow source along the axis of a hemi-cylindrical transmission grating of very large size to permit simultaneous viewing of spectral phenomena by a large number of observers.

9 Claims, 3 Drawing Figures

PATENTED AUG 29 1972 3,687,518

INVENTORS
RALPH G. STEINHARDT
JULIA W. CALHOUN

BY Burns, Doane, Swecker & Mathis
ATTORNEYS

SELF-SLITTING SPECTROSCOPE

BACKGROUND OF THE INVENTION

This invention relates to spectroscopy, and more particularly to a very large spectroscope for simultaneous viewing by a large number of observers.

The spectroscopes generally known comprise a source of electromagnetic radiation in the visible range, a planar transmission grating of prism, and a mask with a very narrow aperture or slit disposed between the source and the grating to restrict the irradiation of the transmission grating to the energy radiated through the slit. Such spectroscopes are generally quite small in size and restrict the viewing of spectral phenomena to one person.

Apparatus for demonstrating spectral phenomena simultaneously to large numbers of viewers, e.g., a class of students, are generally small individual gratings used individually by the viewers. Since no two viewers are observing the same grating, uncertainties are thereby created as to whether or not the same spectral phenomena are present and being viewed by the different observers.

Another technique for demonstrating spectral phenomena simultaneously to large numbers of viewers involves the projection of radiation through a narrow slit and a prism or grating onto a wide screen. These techniques require an extremely intense source and are generally limited to viewing a continuous spectrum.

It is accordingly an object of the present invention to provide novel apparatus for group viewing of spectral phenomena.

It is another object of the present invention to provide a novel apparatus for group viewing of spectral phenomena without the use of projection techniques.

It is still another object of the present invention to provide a novel spectral phenomena viewing apparatus utilizing a single large transmission grating.

It is yet another object of the present invention to provide novel apparatus for viewing spectral phenomena with or without the use of a radiation filter disposed between the radiation source and the transmission grating.

It is yet still another object of the present invention to provide novel apparatus for viewing spectral phenomena from a low intensity source.

It is yet still another object of the present invention to provide novel apparatus exceeding about one square foot in area for viewing spectral phenomena.

These and other objects and advantages of the present invention will be readily apparent from the claims and from the following detailed description of a preferred embodiment when read in conjunction with the appended drawings.

THE DRAWINGS

THE PREFERRED EMBODIMENT

Figure 1:
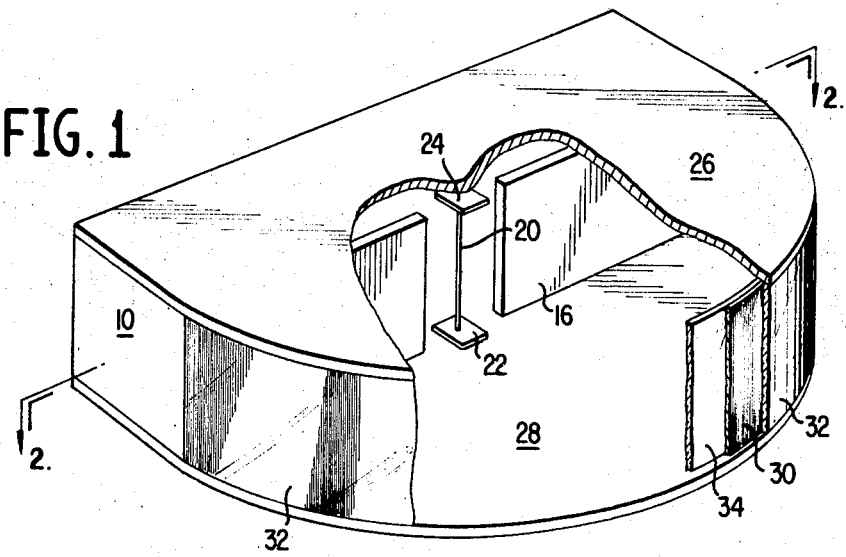
FIG. 1 is a pictorial view of one embodiment of the present invention with portions broken away to illustrate the construction thereof.
Figure 2:
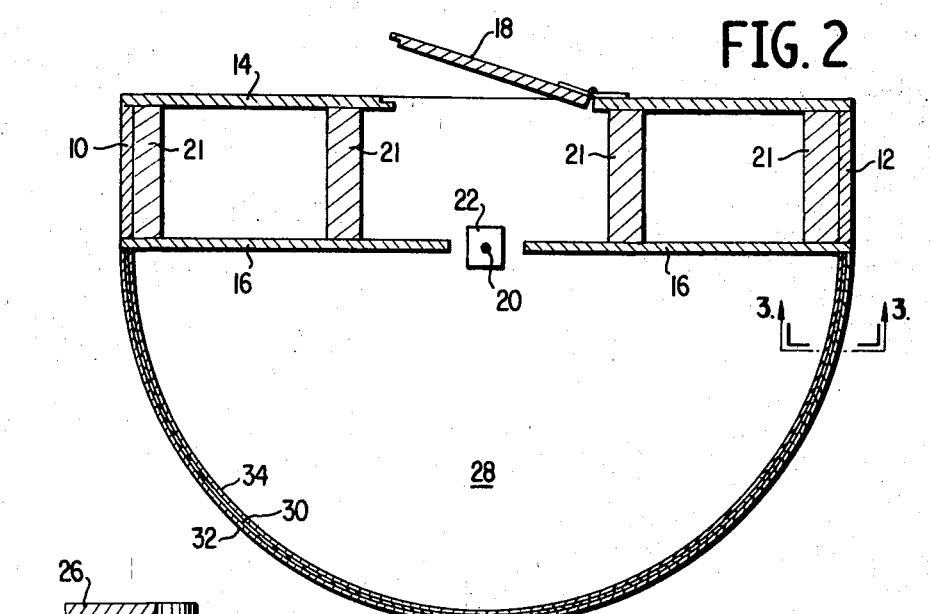
FIG. 2 is a horizontal section taken through lines 2—2 of FIG. 1.

With reference now to the drawings, the preferred embodiment comprises a rigid housing which may be constructed out of wood or other suitable materials. The housing includes end walls 10 and 12, a back wall 14 and a front wall 16. The back wall 14 may be provided with a door 18 suitably hinged to the back wall 14 by conventional means (not shown) to provide access to the interior of the housing. The front wall 16 of the housing may be apertured across the height thereof to provide sufficient space for the mounting of a narrow source 20 of electromagnetic radiation at a range of wavelengths from about 700 to about 400 nanometers. Suitable reinforcing members 21 may be included as necessary to structurally reinforce the housing and to provide the desired rigidity.

In the preferred embodiment illustrated, the source 20 comprises a tungsten wire of approximately 0.1 to 4 millimeters in diameter, heated electrically to incandescence in vacuo or in an inert gas at suitable mounting plates 22 and 24 conveniently aligned with the front wall 16 of the housing in the center of the aperture therein and a suitable source of power (not shown) connected thereto. The mounting plates 22 and 24 may be connected in any suitable convenient manner to the top 26 and bottom 28 surfaces of the housing which may extend, as illustrated, to provide support for the transmission grating 30 hereinafter to be described.

Figure 3:
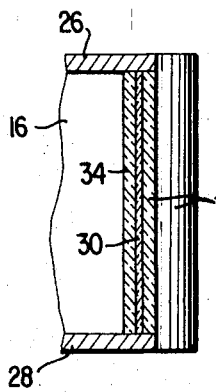
FIG. 3 is a vertical section taken through lines 3—3 of FIG. 2.

The transmission grating 30, as particularly illustrated in FIGS. 1 and 3, may be of any suitable transparent material such as glass or plastic ruled with parallel lines at a density of about 6,000 to about 20,000 lines per inch. In this regard, the generally available density of 13,400 lines per inch has been found generally satisfactory. The lines are parallel to the length of the wire 20 and the grating height may be in excess of about 6 inches. The transmission grating 30 may be laminated between suitable sheets 32 and 34 of transparent material such as glass or plastic to provide additional support for the grating 30. Transparent material of a thickness of one-sixteenth inch has been found suitable for this purpose.

The transmission grating 30 is conveniently arranged in the form of a hemi-cylinder about the wire 20. By means of a grating of the type described having a radius of approximately 18 inches and a height of approximately the same dimension, spectral phenomena in the visible region have been simultaneously demonstrated to large numbers of people.

The grating 30 need not, however, be of a constant radius or even arcuate, as one or a series of planar surfaces may be successfully utilized. If, however, the spectroscope is to be utilized to obtain quantitative data, the radius to the grating should be substantially constant. The area of the grating should be in excess of about 1 square foot.

Other sources such as a Geissler or other gas discharge tube may be utilized in lieu of the tungsten wire or ribbon disclosed. The source must, however, be narrow, i.e., self-slitting, in order to permit viewing of the spectral phenomena by large numbers of observers. The nature of the source is not critical so long as the wavelength of the emitted energy lies in the range of about 700 to 400 nanometers, i.e. the visible range.

One or more optical filters (not shown) may be interposed between the source 20 and the grating 30, or between the grating 30 and the viewer to permit demonstration of spectral absorption.

The present invention may thus be embodied in other specific forms without departing from the spirit or essential characterization thereof. For example, a suitable scale may be provided on the constant radius embodiment illustrated to facilitate obtaining quantitative spectroscopic data. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A self-slitting spectroscope for the simultaneous viewing of spectral phenomena in the visible region by a plurality of observers comprising:
   a semi-cylindrical transmission grating, the area of said grating being sufficient to permit the simultaneous viewing of the grating by a plurality of observers; and,
   a self-slitting source of electromagnetic wave energy having a wavelength in the range from about 700 to about 400 nanometers, said source being mounted on the axis of said transmission grating whereby a plurality of observers may simultaneously view spectral phenomena in the visible region.

2. The self-slitting spectroscope of claim 1 wherein said grating is laminated between sheets of plastic.

3. The self-slitting spectroscope of claim 1 wherein said source is a gas discharge tube.

4. The self-slitting spectroscope of claim 1 wherein said source is a tungsten wire having a width less than about 10 millimeters.

5. The self-slitting spectroscope of claim 1 wherein the radius of said grating is not less than about 1 foot.

6. The self-slitting spectroscope of claim 5 wherein said grating is laminated between sheets of plastic; and wherein said source is a tungsten wire having a diameter less than about 10 millimeters.

7. The self-slitting spectroscope of claim 6 wherein the height of said grating is substantially equal to the radius thereof.

8. The self-slitting spectroscope of claim 1 wherein the height of said grating is substantially equal to the radius thereof.

9. A self-slitting spectroscope for the simultaneous viewing of spectral phenomena in the visible region by a plurality of persons comprising:
   a housing having an elongated aperture in one wall thereof;
   an elongated source of electromagnetic energy at a wavelength in the range from about 700 to 400 nanometers;
   means for mounting said source in the aperture in said one wall of said housing;
   a transmission grating including a transparent material having a height of not less than about 6 inches, an area not less than about 1 square foot and being ruled with not less than about 6,000 lines to the inch; and
   means for mounting said transmission grating at a distance not less than about 1 foot from the aperture in said one wall whereby a plurality of observers may simultaneously view spectral phenomena in the visible region.

* * * * *